United States Patent
Susella et al.

(10) Patent No.: US 11,582,039 B2
(45) Date of Patent: Feb. 14, 2023

(54) METHOD FOR PERFORMING CRYPTOGRAPHIC OPERATIONS IN A PROCESSING DEVICE, CORRESPONDING PROCESSING DEVICE AND COMPUTER PROGRAM PRODUCT

(71) Applicant: STMICROELECTRONICS S.r.l., Agrate Brianza (IT)

(72) Inventors: Ruggero Susella, Milan (IT); Filippo Melzani, Burago di Molgora (IT); Guido Marco Bertoni, Bernareggio (IT)

(73) Assignee: STMICROELECTRONICS S.r.l., Agrate Brianza (IT)

( * ) Notice: Subject to any disclaimer, the term of this patent is extended or adjusted under 35 U.S.C. 154(b) by 130 days.

(21) Appl. No.: 17/129,688

(22) Filed: Dec. 21, 2020

(65) Prior Publication Data
US 2021/0194689 A1 Jun. 24, 2021

(30) Foreign Application Priority Data
Dec. 24, 2019 (IT) .................. 102019000025567

(51) Int. Cl.
*H04L 9/30* (2006.01)
*H04L 9/08* (2006.01)
*H04L 9/14* (2006.01)

(52) U.S. Cl.
CPC ............ *H04L 9/3066* (2013.01); *H04L 9/085* (2013.01); *H04L 9/0825* (2013.01); *H04L 9/14* (2013.01); *H04L 2209/046* (2013.01)

(58) Field of Classification Search
CPC ..... H04L 9/3066; H04L 9/0825; H04L 9/085; H04L 9/14; H04L 2209/046
See application file for complete search history.

(56) References Cited

U.S. PATENT DOCUMENTS

| 8,781,110 B2 * | 7/2014 | Gopal ..................... G06F 7/725 708/492 |
| 9,772,821 B2 | 9/2017 | Feix et al. |

(Continued)

FOREIGN PATENT DOCUMENTS

| WO | 2015/199675 A1 | 12/2015 |
| WO | 2019/089590 A1 | 5/2019 |

OTHER PUBLICATIONS

Mukhtar et al., "Machine-Learning-Based Side-Channel Evaluation of Elliptic-Curve Cryptographic FPGA Processor," *Appl. Sci.* 9(64):2019, 20 pages.

(Continued)

*Primary Examiner* — Darshan I Dhruv
(74) *Attorney, Agent, or Firm* — Seed Intellectual Property Law Group LLP (57) ABSTRACT

A method performs cryptographic operations on data in a processing device. An iterative operation between a first operand formed by a given number of words and a second operand using a secret key is performed. The iterative operation includes, for each bit of the secret key, applying one of a first set operations and a second set of operations to the first operand and to the second operand depending on of the bit, and conditionally swapping words of the first and the second operand based on a control bit value obtained by applying a logic XOR function to a random bit.

23 Claims, 3 Drawing Sheets

(56) References Cited

U.S. PATENT DOCUMENTS

| | | | | |
|---|---|---|---|---|
| 2009/0067619 | A1* | 3/2009 | Eberle | G06F 7/724 |
| | | | | 380/28 |
| 2010/0322422 | A1 | 12/2010 | Al-Gahtani et al. | |
| 2012/0207298 | A1* | 8/2012 | Meyer | G06F 7/725 |
| | | | | 380/28 |
| 2015/0288520 | A1 | 10/2015 | Jacobson et al. | |
| 2019/0379529 | A1* | 12/2019 | Meyer | H04L 9/008 |
| 2020/0351073 | A1* | 11/2020 | Loiseau | H04L 9/3066 |
| 2021/0165633 | A1* | 6/2021 | Guilley | G06F 7/501 |
| 2021/0243006 | A1 | 8/2021 | Meyer | |
| 2022/0075879 | A1* | 3/2022 | Hamburg | G06F 21/602 |

OTHER PUBLICATIONS

Wikipedia, "Swap (computer programming)," downloaded on Jul. 28, 2020, from https://en.wikipedia.org/w/index.php?title=Swap_(computer_programming)&oldid=880864496, 4 pages.

Okeya et al., "A Fast Scalar Multiplication Method with Randomized Projective Coordinates on a Montgomery-Form Elliptic Curve Secure against Side Channel Attacks," *ICIS Conference*, Apr. 2002, LNCS 2288, pp. 428-439.

Heyszl et al., "Localized Electromagnetic Analysis of Cryptographic Implementations," Cryptographers' Track at the RSA Conference, Feb. 27-Mar. 2, 2012, San Francisco, CA, pp. 231-244.

Menezes et al., *Handbook of Applied Cryptography*, CRC Press, Boca Raton, FL, Chapter 14, "Efficient Implementation," pp. 591-634, 1997.

Mukhtar et al., "Machine-Learning-Based Side-Channel Evaluation of Elliptic-Curve Cryptographic FPGA Processor," Appl. Sci. 9(64): 2019, 20 pages.

* cited by examiner

METHOD FOR PERFORMING CRYPTOGRAPHIC OPERATIONS IN A PROCESSING DEVICE, CORRESPONDING PROCESSING DEVICE AND COMPUTER PROGRAM PRODUCT

BACKGROUND

Technical Field

The present description relates to techniques for performing cryptographic operations on data in a processing device.

Various embodiments may apply, such as a smartcard, microcontrollers, a set-top-box using an encryption or digital signature scheme, etc.

Description of the Related Art

Cryptographic protocols are abstract or concrete protocols that perform a security-related function and apply cryptographic methods, often as sequences of cryptographic primitives.

In the field of protection from Side Channel Attacks in devices which use cryptographic algorithms, e.g., microcontroller implementing encryption algorithms, such as ECC or RSA, vertical Side Channel Attacks (SCA) are known, where the attacker can encrypt arbitrary data (input) using the device, in order to get the cryptographic key used by the encryption algorithm. The attackers record side channel information during encryption of known input data, the side channel being represented by power consumption, electromagnetic radiation, or other similar quantities.

The side channel is linked with the data processed by the device, which are the cryptographic key and the attacker's data fed as input, which represent therefore known data.

The attacker records many "traces" with different known input data and a constant unknown key, making hypotheses on the value of a portion of the cryptographic key, and uses statistical methods to verify such hypotheses using the traces. To apply such statistical methods the attacker needs to use many traces, each with different and known input data and constant key.

However, in asymmetric cryptography there are mathematical ways to modify the secret key for each execution such that the result of the operation does not change, although the data used during the computation changes. Thus, the attacker cannot collect many traces because the key is not constant anymore.

For this reason, when the attacker needs to work on a single trace, the attacker deploys the so-called Horizontal Attacks.

In a device to be protected, e.g., processing unit or microcontroller, usually there is a memory, which stores input/output data and intermediate values, a controller, which reads words from RAM memory and stores them into registers, then "calls" the multiplier on registers, e.g., a multiplier unit which performs multiplication operation on operands stored in the registers. The multiplier multiplies operands and writes the result to the RAM memory. In such a situation over 95% of the computation is done within the multiplier.

Figure 1:
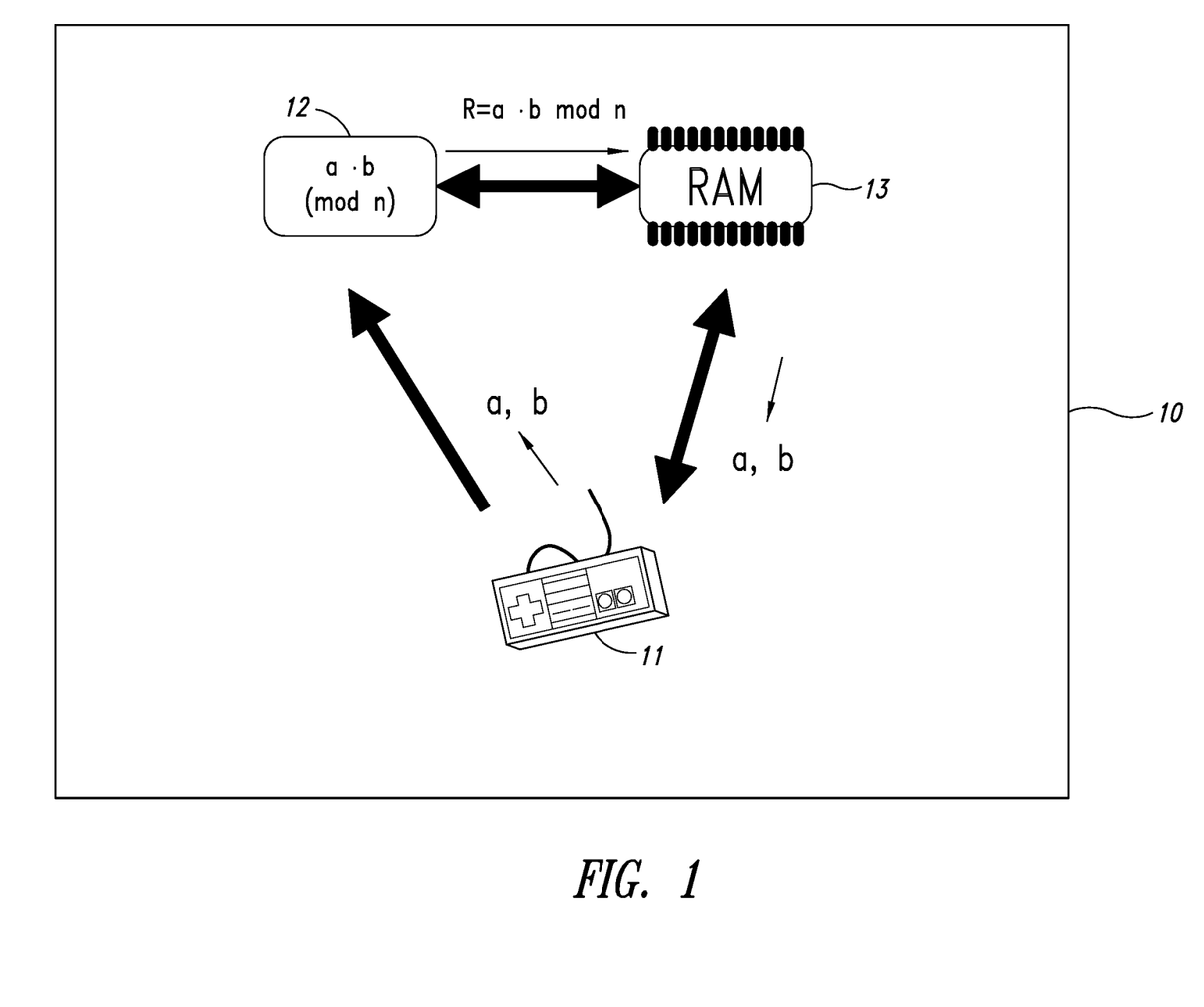

To this regard, in FIG. 1 it is shown a processing unit or device 10 which includes a controller unit or circuit 11, which reads words, indicated as a and b in FIG. 1, from a memory 13, e.g., a RAM memory, and stores them into registers provided in the controller unit 11, then calls a multiplier unit 12 on the content of the registers, words a, b.

The multiplier unit 12 performs multiplication operation on operands a, b stored in the registers of the controller 11. The multiplier 12 multiplies operands, e.g., performs a modulo n multiplication R=a·b mod n, and writes the result R to the RAM memory 13.

With reference to a conventional processing device architecture, the controller unit 11 and the multiplier 12 may correspond to the control unit and ALU of a processing unit such as a CPU, while the memory 13 can be external with respect to the processing device 10. It is noted that such elements 11, 12, 13 in variant embodiments may be hardware or software implemented, or various combinations thereof.

In asymmetric cryptography it can be used for instance RSA (Rivest-Shamir-Adleman) cryptography which involves a loop implementing Modular Exponentiation, or ECC (Elliptic Curve Cryptography) which involves a loop implementing Elliptic Curve Scalar Multiplication.

In ECC cryptography a main loop implementing iteratively a scalar multiplication of given operand P by the scalar k, the secret key, is used. At the beginning, outside of such loop, a first operand $Q_0$ is initialized to the point at infinity and a second operand $Q_1$ is set to the given operand P.

After all the bits of the secret key k have been processed in the main loop, the first operand $Q_0$ is returned as result of k*P. Such loop is implemented as shown in the following group of instructions (1), representing the iteration for secret key bit value $k_i$:

| L1. | if $k_i$ = 0: | (1) |
|---|---|---|
| L2. | $Q_1$ = Add($Q_1,Q_0$) | |
| L3. | $Q_0$ = Double($Q_0$) | |
| L4. | else: | |
| L5. | $Q_0$ = Add($Q_0,Q_1$) | |
| L6. | $Q_1$ = Double($Q_1$) | | where $k_i$ is the i-th bit of the secret key k, $Q_0$, $Q_1$ the first and second operands read from the memory 13 or also from the corresponding registers of the controller unit 11, Add and Double the elliptic curve point addition and elliptic curve point doubling operations. $Q_1,Q_0$ are points expressed in projective format (X,Y,Z) where for instance (x,y)=X/Z, Y/Z. In variant embodiments, other types of projective coordinates can be used, such as (x,y)=$X/Z^2$,$Y/Z^3$.

The main loop (1) of the point multiplication thus includes that for each bit $k_i$ of the secret key k, specifically each bit i if the bit is 1 bit in length, if such bit $k_i$ is zero, the second operand $Q_1$ is set, e.g. written in the same address of the memory 13, corresponding to the operand variable, equal to the sum of the two operands $Q_1,Q_0$ and the first operand $Q_0$ is multiplied by two, else the first operand $Q_0$ is equal to the sum of the two operands $Q_1,Q_0$ and the second operand $Q_1$ is multiplied by two.

Also, by way of example in RSA the main loop is implemented by the following group of instructions (2), representing the iteration for each secret key bit $k_i$:

| M1. | if $k_i$ = 0: | (2) |
|---|---|---|
| M2. | $q_1$ = s * $q_1$ | |
| M3. | s = s * s | |
| M4. | else: | |

-continued

| M5. | $q_0 = s * q_0$ |
| M6. | $s = s * s$ | where s is a value called square, $q_0$ or $q_1$ the operands read from the memory 13, $q_0$ in general representing a base of the modular exponentiation and $q_1$ a dummy integer value.

The RSA main loop of the point multiplication thus includes that for each bit $k_i$ of the secret key k, specifically each bit $k_i$,
if such bit $k_i$ is zero, the second operand is set equal $q_1$ to the second operand $q_1$ multiplied by the square s, $s*q_1$, and the square s set equal to square multiplied by itself, $s*s$,
else the first operand $s*q_0$ is set equal to the first operand $q_0$ multiplied by the square s, $s*q_0$, and the square s set equal to square multiplied by itself, $s*s$.

Three families of Horizontal Attacks are usually identified:
Attacks on Secret Bit Manipulation
Attacks on Addresses
Attacks on Data Based on read/write patterns for instance, for ECC asymmetric cryptography with the multiplication loop (1), if the attacker can understand
whether the ECC operand $Q_0$ or $Q_1$ is read or written during the Double operation, or
whether the ECC operand $Q_0$ or $Q_1$ is written during the Add operation.
then the attacker can recover the secret key bits $k_i$.

Based on read/write patterns for instance, for RSA asymmetric cryptography with the multiplication loop (2), if the attacker can understand whether the RSA operand $q_0$ or $q_1$ is read or written during the multiplication, then the attacker can recover the secret key bits $k_i$.

In Attacks on Addresses Horizontal Attacks (HA), this family of attacks relies on a single trace and split the single trace in subtraces, one for each iteration of the loop, then the attacker tries to find similarities (or differences) among subtraces with same (or different) value of the secret key bits $k_i$.

With statistical methods it is possible to identify the so called "leakage points" where the secret key bits $k_i$ can be extracted.

From the publication "*Localized Electromagnetic Analysis of Cryptographic Implementations*," by Johann Heyszl, Stefan Mangard, Benedikt Heinz, Frederic Stumpf, and Georg Sigl it is known a method of protection from horizontal side channel attacks where it is used a arithmetic conditional swap, or cswap, operation defined as follows, by instructions (3).

| I1. | def cswap($Q_0,Q_1$,c): | (3) |
| I2. | $T = Q_0 + Q_1$ | |
| I3. | $Q_0 = T - Q_{1-c}$ // $Q_0 = Q_0$ if c = 0 else $Q_0 = Q_1$ | |
| I4. | $Q_1 = T - Q_c$ // $Q_1 = Q_1$ if c = 1 else $Q_1 = Q_0$ | | where T is the value sum of the operands, c is a control bit value, $Q_{1-c}$ and $Q_c$ are subtraction values which correspond to operands $Q_0$ or $Q_1$ respectively, depending on the value of the control value c, which value determines if the value of the operands $Q_0$ and $Q_1$ is swapped, one with respect to the other, or no.

The scalar multiplication operation as a whole, comprising the main multiplication loop, ECC loop (1) here below, is implemented as follows, with the group of instructions (4).

Often, a mask variable swap is initialized, NO, to zero, swap=0, then for each bit e.g., for i=1 to len, len being the number of bits of the secret key k

| N1 | if swap $\oplus$ $k_i$ = 0 | (4) |
| N2 | $Q_1$ = Add($Q_1,Q_0$) | |
| N3 | $Q_0$ = Double($Q_0$) | |
| N4 | else: | |
| N5 | $Q_0$ = Add($Q_0,Q_1$) | |
| N6 | $Q_1$ = Double($Q_1$) | |
| N7 | r = random_bit( ) | |
| N8 | cswap($Q_0,Q_1$,swap$\oplus$r) | |
| N9 | swap = r | |
| N10 | end for | |

As it can be seen a variable swap is set at zero before performing an iteration, and it is then XORed (N1 step) with the i-th bit of the secret key $k_i$ to form the masked control bit swap $\oplus$ $k_i$, which value determines which of the two different sets of equations is implemented in the loop (1), N2, N3 or N5, N6. Then in a step N7 a random bit r value is set by applying random generation function random_bit( ), which is either logic zero or logic one. The random bit r then is XORed with the mask variable swap to determine the control bit c value for the cswap function, which is performed next (step N8, corresponding for instance to instructions (3)). Then, before the next iteration, in step N9 the variable swap is set at the random bit r value. It is observed that the iteration is performed for each bit of the secret key however the reading operation of the secret key k to acquire such bits from the memory can be performed also word by word.

Steps N1-N6 correspond to the ECC scalar multiplication loop (1) shown above, which can be equivalently substituted by the RSA modular exponentiation loop (2).

Thus, this method exploits a known technique in software development to avoid cache-timing issues, which provides conditionally swapping two big integers based on the value of bit.

The limitations of this method include that an address Horizontal Attacks on the reading of subtraction value $Q_c$ from cswap operation will recover the random bit r. Also it is possible to use a Horizontal Attack to recover the value swap$\oplus k_i$, and another Horizontal Attack to recover the control value c. With both attacks it is possible to recover the secret key bits $k_i$. Also the operation $Q_0=Q_0$ in performing cswap function is significantly different, e.g., with respect to consumption, from the operation $Q_0=Q_1$. This method also does not protect the first iteration.

BRIEF SUMMARY

The present description relates to techniques for performing cryptographic operations on data in a processing device including applying an asymmetric cryptographic procedure including performing an iterative operation between a first operand formed by a given number of words and a second operand using a secret key, the iterative operation including at least, for each bit of the secret key, the steps of:
performing mathematical operations applying two different sets of operations to the first operand and to the second operand depending on the value of a function of the bit of the secret key, performing a conditional swap on words of the first and second operand on the basis of a control bit value, the control bit value being obtained applying a logic XOR function to a random bit.

One or more embodiments facilitate providing a method for cryptographic operation of data in a processing device including performing an operation that addresses the drawbacks of the prior art and in particular is more resistant to combined Horizontal Attacks.

One or more embodiments may refer to a corresponding processing device performing the method and to a computer program product that can be loaded into the memory of at least one computer and comprises parts of software code that are able to execute the steps of the method when the product is run on at least one computer. As used herein, reference to such a computer program product is understood as including reference to a computer-readable means containing instructions for controlling the processing system in order to co-ordinate implementation of the method according to the embodiments. Reference to "at least one computer" is evidently intended to highlight the possibility of the present embodiments being implemented in modular and/or distributed form.

In an embodiment, a method for cryptographic operation of data in a processing device includes
  cryptographic operations on data in a processing device including applying an asymmetric cryptographic procedure including performing an iterative operation between a first operand formed by a given number of words and a second operand using a secret key,
  the iterative operation including at least, for each bit of the secret key, the steps of:
    performing mathematical operations applying two different sets of operations to the first operand and to the second operand depending on the value of a function of the bit of the secret key,
    performing a conditional swap on words of the first and second operand on the basis of a control bit value, the control bit value being obtained applying a logic XOR function to a random bit,
  wherein the conditional swap includes
    storing in a first register the word of the first operand,
    storing in a second register a corresponding word of the second operand,
    then storing as word of the first operand the value of the first or second register depending on the control bit value, and
    storing as corresponding word of the second operand the value of the second or first register depending on the control bit value.

In variant embodiments, the conditional swap includes
  after storing in a first register the word of the first operand and storing in a second register a corresponding word of the second operand,
  rewriting the first operand and second operand by storing in them respective rewriting values,
  then storing as word of the first operand the value of the first or second register depending on the control bit value and
  storing as corresponding word of the second operand the value of the second or first register depending on the control word value.

In variant embodiments, the rewriting step includes that the respective rewriting values are zero or constant values.

In variant embodiments, the rewriting step includes that the respective values are random generated values.

In variant embodiments, the rewriting step includes that the respective values are different one with respect to the other.

In variant embodiments, the cryptographic operation includes, prior the asymmetric cryptography iterative procedure, initializing a mask variable, and the iterative procedure includes
  for each bit of the secret key,
    setting the random bit,
    obtaining a randomized key by performing a logic XOR operation between the current bit of the secret key and the random bit,
    performing the conditional swap using as control bit the result of a logic XOR operation between the mask variable and the random bit,
    set the mask variable to the random bit value
    perform the asymmetric cryptographic multiplication iteration selecting the set of operation to apply to the first operand and to the second operand depending on the value of the randomized key value.

In variant embodiments, the method includes providing in the processing unit
  a first mask register to store the random bit
  a second register to store the randomized key bit
  a third and fourth mask register to store the complement of the content of the first and second mask register respectively.

In variant embodiments, the asymmetric cryptographic operation is an ECC scalar multiplication or a RSA modular exponentiation.

The embodiments here described refer also to embodiments of a processing device configured to perform the steps of the method of any of the previous embodiments.

The embodiments here described refer also to a computer program product that can be loaded into the memory of at least one computer and comprises parts of software code that are able to execute the steps of the method of any of of the previous embodiments when the product is run on at least one computer.

In an embodiment, a method comprises: performing cryptographic operations on data in a processing device, the performing including applying an asymmetric cryptographic procedure including an iterative operation between a first operand formed by a given number of words and a second operand using a secret key, the iterative operation including, for each bit of the secret key: applying one of a first set operations and a second set of operations to the first operand and to the second operand depending on the bit of the secret key; and conditionally swapping words of the first and the second operand on the basis of a control bit value, the control bit value being obtained applying a logic XOR function to a random bit, wherein the conditional swap includes: storing in a first register the word of the first operand; storing in a second register a corresponding word of the second operand; storing in the word of the first operand the value of the first or second register depending on the control bit value; and storing in the corresponding word of the second operand the value of the second or first register depending on the control bit value. In an embodiment, the conditional swap includes, after storing in the first register the word of the first operand and storing in the second register a corresponding word of the second operand: rewriting the first operand and second operand by storing in them respective rewriting values; then storing in the word of the first operand the value of the first or second register depending on the control bit value; and storing in the corresponding word of the second operand the value of the second or first register depending on the control word value. In an embodiment, the respective rewriting values are zero or constant values. In an embodiment, the respective rewriting values are random generated values. In an embodiment, the respective rewriting values are different from one another. In an embodiment, the asymmetric cryptographic procedure is a multiplication operation including, prior to the iterative procedure, initializing a mask variable, and the iterative procedure includes: for each bit of the secret key: setting the random bit; obtaining a randomized key value by performing a logic XOR operation on the current bit of the secret key and the random bit; performing the conditional swap using as control bit the result of a logic XOR operation on the mask variable and the random bit; setting the mask variable to the random bit value; and performing a loop of the asymmetric cryptographic multiplication selecting the set of operations to apply to the current word of the first operand and to a corresponding word of the second operand depending on the value of the randomized key value. In an embodiment, the method comprises: storing the random bit in a first mask register; storing the randomized key value in a second mask register; storing a complement of a value stored in the first mask register in a third mask register; and storing a complement of a value stored in the second mask register in a fourth mask register. In an embodiment, the iterative operation includes an Elliptic Curve Cryptography (ECC) scalar multiplication loop or a Rivest-Shamir-Adleman (RSA) modular exponentiation loop.

In an embodiment, an apparatus comprises: a plurality of registers; and logic circuitry coupled to the plurality of registers, wherein the logic circuitry, in operation, performs, using a secret key, an iterative operation between a first operand formed by a number of words and a second operand, the iterative operation including, for each bit of the secret key: applying one of a first set operations and a second set of operations to the first operand and to the second operand depending on the bit of the secret key; and conditionally swapping words of the first and the second operand on the basis of a control bit value, the control bit value being obtained applying a logic XOR function to a random bit, wherein the conditional swap includes: storing in a first register of the plurality of registers the word of the first operand; storing in a second register of the plurality of registers a corresponding word of the second operand; storing in the word of the first operand the value of the first or second register depending on the control bit value; and storing in the corresponding word of the second operand the value of the second or first register depending on the control bit value. In an embodiment, the conditional swap includes: after storing in the first register the word of the first operand and storing in the second register the corresponding word of the second operand: rewriting the first operand and second operand by storing in them respective rewriting values; storing in the word of the first operand the value of the first or second register depending on the control bit value; and storing in the corresponding word of the second operand the value of the second or first register depending on the control word value. In an embodiment, the respective rewriting values are zero or constant values. In an embodiment, the respective rewriting values are random generated values. In an embodiment, the respective rewriting values are different from one another. In an embodiment, the iterative procedure is part of an asymmetric cryptographic procedure including a multiplication operation, and the logic circuitry, in operation, initializes a mask variable prior to the iterative procedure, the iterative procedure including: for each bit of the secret key: setting the random bit; obtaining a randomized key value by performing a logic XOR operation on the current bit of the secret key and the random bit; performing the conditional swap using as control bit the result of a logic XOR operation on the mask variable and the random bit; and setting the mask variable to the random bit value, wherein performing a loop of the asymmetric cryptographic multiplication includes selecting the set of operations to apply to the current word of the first operand and to a corresponding word of the second operand depending on the value of the randomized key value. In an embodiment, the logic circuitry, in operation: stores the random bit in a first mask register of the plurality of registers; stores the randomized key value in a second mask register of the plurality of registers; stores a complement of a value stored in the first mask register in a third mask register of the plurality of registers; and stores a complement of a value stored in the second mask register in a fourth mask register of the plurality of registers. In an embodiment, the iterative operation includes an Elliptic Curve Cryptography (ECC) scalar multiplication loop or a Rivest-Shamir-Adleman (RSA) modular exponentiation loop.

In an embodiment, a system comprises: a multiplier; a random access memory; and a controller, including: a plurality of registers; and logic circuitry coupled to the plurality of registers, wherein the logic circuitry, in operation, performs, using a secret key, an iterative operation between a first operand formed by a number of words and a second operand, the iterative operation including, for each bit of the secret key: applying one of a first set operations and a second set of operations to the first operand and to the second operand depending on the bit of the secret key; and conditionally swapping words of the first and the second operand on the basis of a control bit value, the control bit value being obtained applying a logic XOR function to a random bit, wherein the conditional swap includes: storing in a first register of the plurality of registers the word of the first operand; storing in a second register of the plurality of registers a corresponding word of the second operand; storing in the word of the first operand the value of the first or second register depending on the control bit value; and storing in the corresponding word of the second operand the value of the second or first register depending on the control bit value. In an embodiment, the conditional swap includes: after storing in the first register the word of the first operand and storing in the second register the corresponding word of the second operand: rewriting the first operand and second operand by storing in them respective rewriting values; storing in the word of the first operand the value of the first or second register depending on the control bit value; and storing in the corresponding word of the second operand the value of the second or first register depending on the control word value. In an embodiment, the iterative procedure is part of an asymmetric cryptographic procedure including a multiplication operation, which, in operation is performed by the multiplier, and the logic circuitry, in operation, initializes a mask variable prior to the iterative procedure, the iterative procedure including: for each bit of the secret key: setting the random bit; obtaining a randomized key value by performing a logic XOR operation on the current bit of the secret key and the random bit; performing the conditional swap using as control bit the result of a logic XOR operation on the mask variable and the random bit; and setting the mask variable to the random bit value, wherein performing a loop of the asymmetric cryptographic multiplication includes selecting the set of operations to apply to the current word of the first operand and to a corresponding word of the second operand depending on the value of the randomized key value. In an embodiment, the logic circuitry, in operation: stores the random bit in a first mask register of the plurality of registers; stores the randomized key value in a second mask register of the plurality of registers; stores a complement of a value stored in the first mask register in a third mask register of the plurality of registers; and stores a complement of a value stored in the second mask register in a fourth mask register of the plurality of registers.

In an embodiment, a non-transitory computer-readable medium's contents cause a computing device to perform an asymmetric cryptographic procedure including an iterative operation, the iterative operation on a first operand formed by a given number of words and a second operand using a secret key, the iterative operation including, for each bit of the secret key: applying one of a first set operations and a second set of operations to the first operand and to the second operand depending on the bit of the secret key; and conditionally swapping words of the first and the second operand on the basis of a control bit value, the control bit value being obtained applying a logic XOR function to a random bit, wherein the conditional swap includes: storing in a first register the word of the first operand; storing in a second register a corresponding word of the second operand; storing in the word of the first operand the value of the first or second register depending on the control bit value; and storing in the corresponding word of the second operand the value of the second or first register depending on the control bit value. In an embodiment, the iterative operation includes: storing the random bit in a first mask register; storing the randomized key value in a second mask register; storing a complement of a value stored in the first mask register in a third mask register; and storing a complement of a value stored in the second mask register in a fourth mask register. In an embodiment, the contents comprise instructions executed by the computing device.

BRIEF DESCRIPTION OF THE SEVERAL VIEWS OF THE DRAWINGS

The disclosure will now be described purely by way of a non-limiting example with reference to the annexed drawings, in which:

FIG. 1 was discussed in the foregoing;

DETAILED DESCRIPTION OF EMBODIMENTS

The ensuing description illustrates various specific details aimed at an in-depth understanding of the embodiments. The embodiments may be implemented without one or more of the specific details, or with other methods, components, materials, etc. In other cases, known structures, materials, or operations are not illustrated or described in detail so that various aspects of the embodiments will not be obscured.

Reference to "an embodiment" or "one embodiment" in the framework of the present description is meant to indicate that a particular configuration, structure, or characteristic described in relation to the embodiment is comprised in at least one embodiment. Likewise, phrases such as "in an embodiment" or "in one embodiment," that may be present in various points of the present description, do not necessarily refer to the one and the same embodiment. Furthermore, particular conformations, structures, or characteristics can be combined appropriately in one or more embodiments.

The references used herein are intended merely for convenience and hence do not define the sphere of protection or the scope of the embodiments.

An embodiment here described refers to a method for cryptographic operation of data in a processing device including performing a series of operations between a first operand comprising a given number of words and a second operand, where the series of operations, as in the method shown in the publication by Heyszl et, al, includes performing a conditional swap on the first and second operand on the basis of control bit value, the control bit value being obtained as a XOR function of a random bit.

A first embodiment of the conditional swap cswap can be as follows:

| C1. | def cswap(A, B, c, len): |
|---|---|
| C2. | for j in range(len): |
| C3. | reg[0] = A[j] |
| C4 | reg[1]=B[j] |
| C5. | A[j] = reg[c] |
| C6 | B[j] = reg[1-c] | c is the control bit, and len is the length in words of operands A,B.

Typically, the operands A, B (or $Q_0$, $Q_1$, or $q_0$, $q_1$) are big integers or arrays of big integers, thus they are usually divided in words, j being the word index, and for the operations are read word by word. The word length may be 1 bit.

Thus, an embodiment of the method here proposed includes a multiplication operation, which in general can correspond to the group of instructions (3), and may correspond to the embodiment described in the following including performing a conditional swap on a first and second operand, A, B, on the basis of control bit value c,
  in which for all words of the operands (step C2), from 1 to length len,
  a first register reg[0] stores, writes at a respective register of the controller 11, in steps C3 a word A[j] of the first operand A,
  a second register reg[1] stores C4 a word B[j] of the second operand
  then the word of the first operand is set C5 to value of the first or second register reg[0],reg[1] depending on the control bit value c and
  the word of the second operand is set C6 to the value of the second or first register reg[1],reg[0] depending on the control bit value c.

In this first embodiment, if the control bit c is 0, operand A is written over the operand A, at the same register address, the memory content does not change, thus the power consumption can be recognized.

A second embodiment of the cswap function which facilitates addressing this problem is as follows:

| D1. | def cswap(A, B, c, len): |
|---|---|
| D2. | for j in range(len): |
| D3. | reg[0] = A[j] |
| D4. | reg[1]=B[j] |
| D5. | A[j] = 0 |
| D6. | B[j] = 0 |
| D7. | A[j] = reg[c] |
| D8. | B[j] = reg[1-c] |

In this case after that a first register stores D3 a word of the first operand and a second register stores D4 a corresponding word of the second operand, the word of the operands A[j] and B[j] are set to zero (steps D5, D6).

A third embodiment of the cswap function is as follows

| | | |
|---|---|---|
| E1. | def cswap(A, B, c, len): | |
| E2. | for j in range(len): | |
| E3. | reg[0] = A[j] | |
| E4. | reg[1] = B[j] | |
| E5. | A[j] = 0xAA...A | |
| E6. | B[j] = 0xAA...A | |
| E7. | A[j] = reg[c] | |
| E8. | B[j] = reg[1-c] | |

In the addresses of the first operand A[j] and second operand B[j] are written values different from zero (steps E5, E6).

A fourth embodiment of the cswap function is as follows.

| | | |
|---|---|---|
| F1. | def cswap(A, B, c, len): | |
| F2. | for j in range(len): | |
| F3. | reg[0] = A[j] | |
| F4. | reg[1] = B[j] | |
| F5. | A[j] = 0xAA...A | |
| F6. | B[j] = 0x55...5 | |
| F7. | A[j] = reg[c] | |
| F8. | B[j] = reg[1-c] | |

In the addresses of the first operand A[j] and second operand B[j] are written values different from zero and different from each other (steps F5, F6).

A fifth embodiment of the cswap function is as follows.

| | | |
|---|---|---|
| G1. | def cswap(A, B, c, len): | |
| G2. | for i in range(len): | |
| G3. | reg[0] = A[j] | |
| G4. | reg[1] = B[j] | |
| G5. | A[j] = random 1 | |
| G6. | B[j] = random 1 | |
| G7. | A[j] = reg[c]] | |
| G8. | B[j] = reg[1-c] | |

A[j] and B[j] are set to a random value random 1.

A sixth embodiment of the cswap function is as follows:

| | | |
|---|---|---|
| H1. | def cswap(A, B, c, len): | |
| H2. | for j in range(len): | |
| H3. | reg[0] = A[j] | |
| H4. | reg[1] = B[j] | |
| H5. | A[j] = random1 | |
| H6. | B[j] = random2 | |
| H7. | A[j] = reg[c] | |
| H8. | B[j] = reg[1-c] | |

A[j] and B[j] are set to two different random values random1 and random2 in steps H5, H6.

Thus, the conditional swap according to an embodiment here described includes, after storing in a first register reg[0] the current word A[j] of the first operand A and storing in a second register reg[1] a corresponding word B[j] of the second operand B, rewriting, such as in steps C5, C6, or D5, D6, or E5, E6, or F5, F6, or G5, G6, or H5, H6 the word A[i] of the first operand A and word B[j] of the second operand B by storing in them respective rewriting values, e.g., zero, or constant, or random, equal or different one with respect to the other, then storing as word A(j) of the first operand A the value of the first or second register, reg(0),reg(1) depending on the control bit c value, and storing, such as in steps C7, C8, or D7, D8, or E7, E8, or F7, F8, or G7, G8, or H7, H8, as corresponding word B[j] of the second operand B the value of the second or first register reg(1),reg(0) depending on the control bit value.

Such rewriting step may include that the respective rewriting values are zero as in the second embodiment or constant values, like in the third embodiment.

Such rewriting step may include that such respective rewriting values are random generated values like in the fifth and six embodiment.

Such rewriting step may include that such respective rewriting values are different one with respect to the other, like in the fourth and sixth embodiment.

Now, it is described here an embodiment of the method, which includes for instance a conditional swap as follows:

| | | |
|---|---|---|
| R1. | def Cswap($Q_0$, $Q_1$, c): | |
| R2. | for all words of $Q_0$ | |
| R3. | regWord$Q_0$ = $Q_0$[j] | |
| R4. | regWord$Q_1$ = $Q_1$[j] | |
| R5. | $Q_0$[j] = random_word( ) | |
| R6. | $Q_1$[j] = random_word( ) | |
| R7. | if c == 0: | |
| R8. | $Q_0$[j] = regWord$Q_0$ | |
| R9. | $Q_1$[j] = regWord$Q_1$ | |
| R10. | else: | |
| R11. | $Q_0$[j] = regWord$Q_1$ | |
| R12. | $Q_1$[j] = regWord$Q_0$ | |
| R13. | end for | |

Such conditional swap corresponds substantially to the sixth embodiment, steps R7-R13 expliciting steps H7, H8.

Thus the cswap function defines, for all the words of operand $Q_0$, two register variables regWord$Q_0$, regWord$Q_1$, corresponding to reg0], reg[1] in previous embodiments of cswap, which stores the words in the registers.

Then, an embodiment of the asymmetric cryptographic operation loop is implemented as follows, indicated by the group of instructions (5):

| | | |
|---|---|---|
| S1. | swap = 0 | |
| S2. | for i=n-1 to 0 do | |
| S3. | r=random_bit( ) | |
| S4. | $mk_i$ = $k_i \oplus r$ | |
| S5. | cswap($Q_0$, $Q_1$, swap$\oplus$r) | |
| S6. | swap = r | |
| S7. | if $mk_i$ = 0: | |
| S8. | $Q_1$ = Add($Q_1$,$Q_0$) | |
| S9. | $Q_0$ = Double($Q_0$) | |
| S10. | else: | |
| S11. | $Q_0$ = Add($Q_0$,$Q_1$) | |
| S12. | $Q_1$ = Double($Q_1$) | |
| S13. | end for | | n-1 correspond to number len, the for next cycle starting with for instruction at step S2 is performed starting from the last bit $k_i$ of the key k. In variant embodiments such step may also start from the first bit $k_i$ of the key k.

It is noted that in this case the random bit r is obtained at step S4 before performing the multiplication loop (S7-S12), so that a randomized key value $mk_i$ is function of the random bit r already since from the first iteration.

Figure 3:
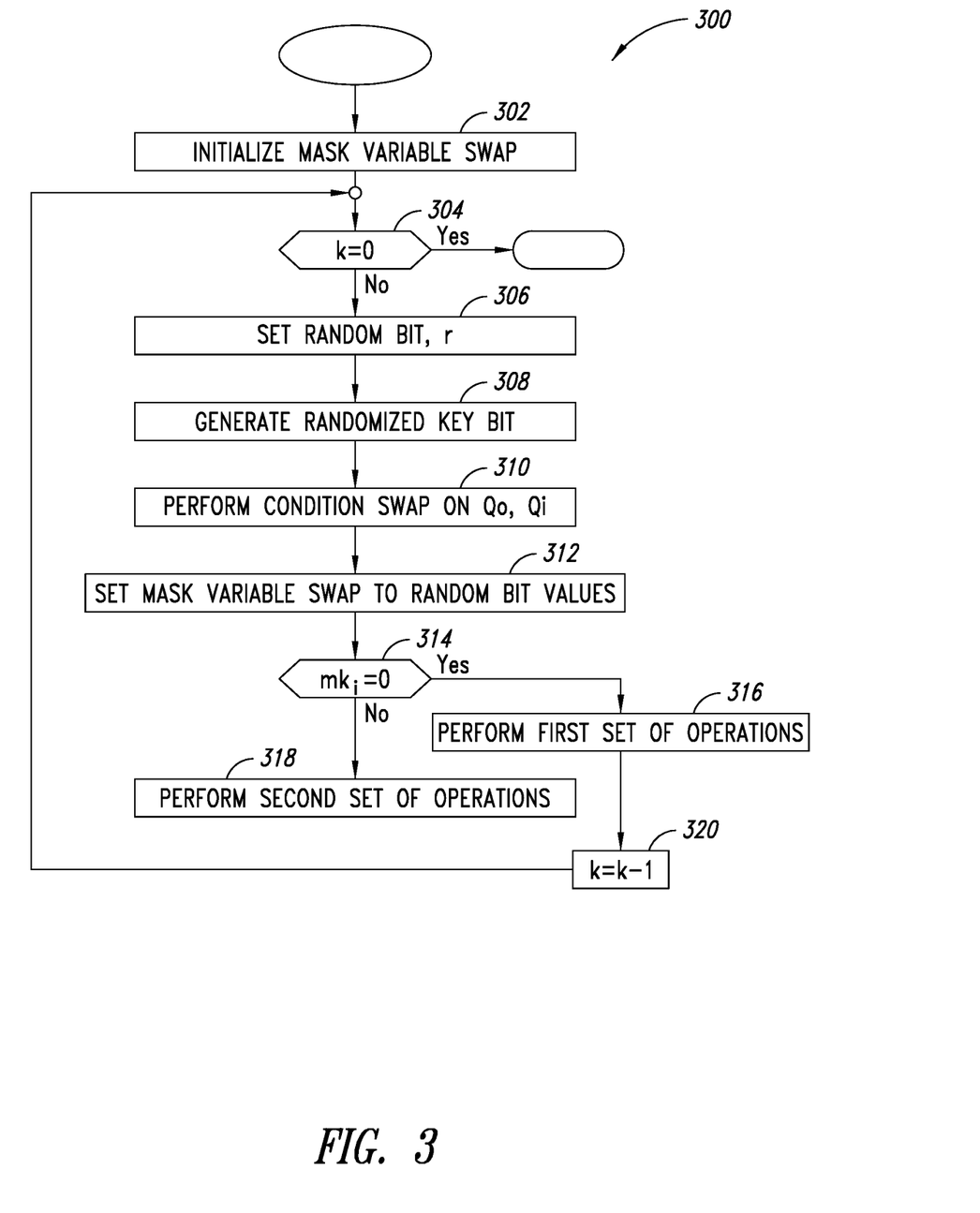
FIG. 3 represents a flow diagram of an embodiment of a method here described.

Thus, a method 300, as depicted in the flow diagram of FIG. 3, corresponding to the iteration of the cryptographic operation loop (S2-S13) includes, initializing a mask variable swap 302, and the iteration includes
for each i-th bit $k_i$ of the secret key k from n−1 to 0, cycle for starting at step 304,
setting 306 such random bit r,
obtaining 308 a randomized key bit by performing a XOR logic operation between the i-th bit $k_i$ of the secret key k and the random bit r,
performing 310 a conditional swap on operands $Q_0$, $Q_1$, using as control bit c an XOR between the mask variable swap and the random bit, the conditional swap being for instance performed according to steps R1-R13. Any of the other embodiments of conditional swap here described can be used, C1-C8; D1-D8; E1-E8; F1-F8; G1-G8; H1-H8;
set 312 the mask variable swap to the random bit r value;
perform the mathematical operations selecting 314 a first set of operations 316 (e.g., S8, S9) or a second set of operations 318 (e.g., S11, S12) to apply to the first operand $Q_0$ and a corresponding second operand $Q_1$ depending on the value of the bit of the randomized key value $mk_i$.

As mentioned, another type of attack can exploit information related to secret bit manipulation, the use of the bit of the secret key, $k_i$.

In particular the if/else in the multiplication loop result in a different state in FSM/multiplexer output which might leak. An Horizontal Attack can be mounted to find the different state of the FSM. If a key bit is used in the main loop iteration, an attacker can understand which branch is taken and derive the key bit Also the loading of key bit $k_i$ implies that the controller unit or circuit 11 needs a bit $k_i$ of the secret key k in a register, so it loads it from memory. A template attack can be mounted to understand the key bit $k_i$ loaded into the register. The attacker can template the word loading trying to identify the word or its hamming weight.

Similarly, since the loop requires a single bit of the secret key at each iteration in order to decide which set of operations apply, thus a template attack can be mounted on the extraction of the secret key bit. As the register is shifted and one bit is taken, the register when shifted can decrease or not in hamming weight, thus an attacker can notice if it decreases or not and recover the key.

Finally, a Fault attack can be mounted, in which the attacker can fault a bit of the register containing the key to modify execution and gain information about the key (Safe Errors or ECDSA HNP). If an attacker can fault a bit of the register, this will be undetected.

Figure 2:
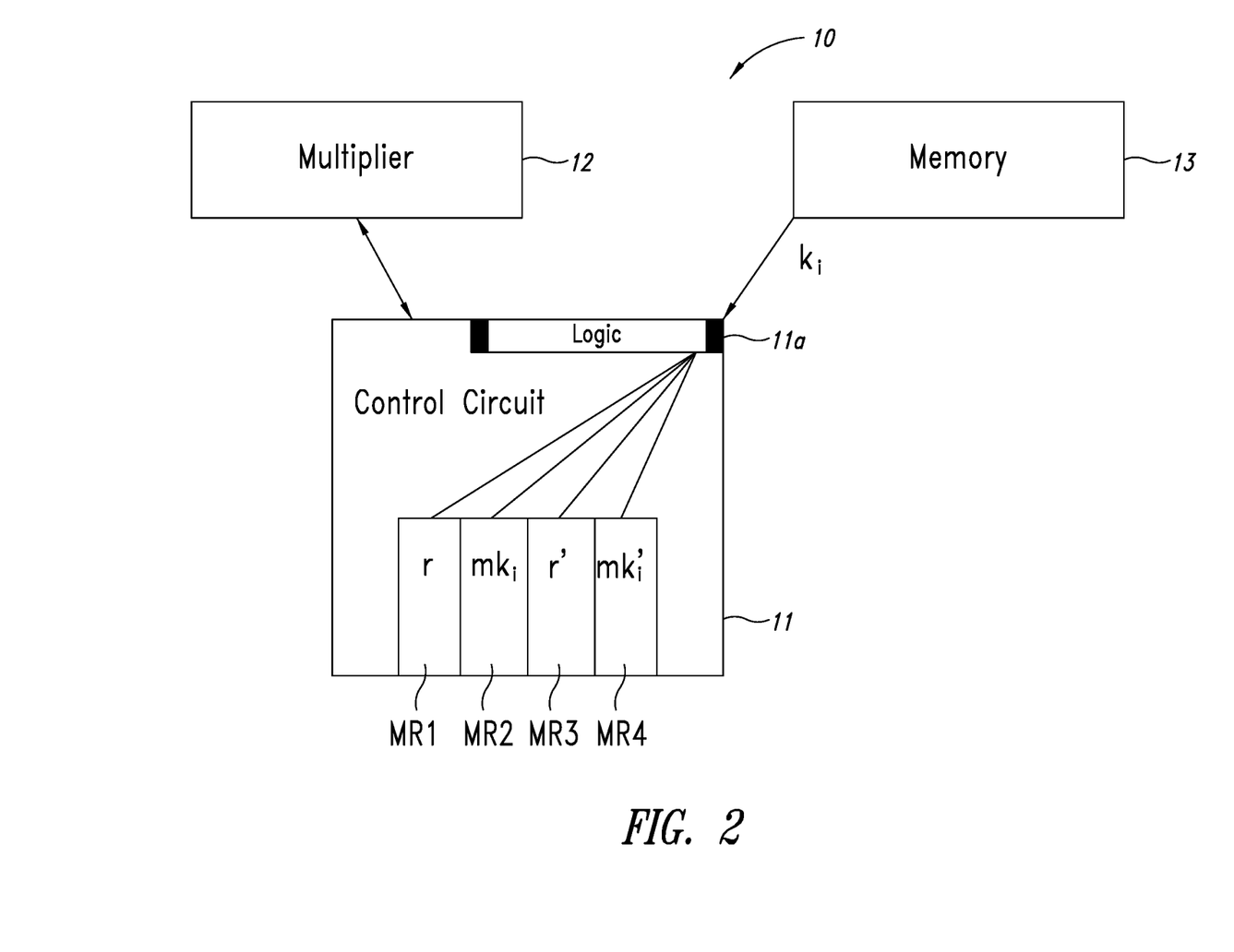
FIG. 2 represents a block scheme of an embodiment of a processing device implementing a method here described.

In order to avoid such issues, an embodiment of a method for performing an asymmetric cryptographic procedure in a processing device including an iterative procedure iterating on one or few bits of the secret key, where in each iteration:
performs a series of mathematical operations to a different set of first and second operands depending on the value of a function of the bit of the secret key,
performs a conditional swap on the words of the first and second operand on the basis of a control bit value, the control bit value being obtained as a XOR function of a random bit, can further provide in the processing unit 10, as shown in FIG. 2, specifically in the controller 11, a first mask register MR1 to store the random bit r
a second mask register MR2 to store the randomized key value $mk_i$
a third M3 and fourth M4 mask register to store the complement of the first and second mask register respectively, r' and $mk'_i$, where ' indicates the bitwise complement operation.

The processing unit or device 10 is configured to operate so that the secret key $k_i$ is loaded from the RAM 13 and XORed, in a logic block indicated with 11a in the control unit or circuit 11, with the random bit r before being registered as randomized key value $mk_i$ in register MR2. The secret key $k_i$ is thus never stored in a register of the control unit 11 during the multiplication.

Also, provisions of the third and fourth mask register determines that, taking one bit out of a mask register rotates the mask register, first or second, and the corresponding complemented register, third or fourth. Thus, there is no shift anymore.

The solution according to the various embodiments here described facilitates obtaining the following advantages.

This solution advantageously employs a cswap which uses addresses in the same order. In this way the register selection has a significantly lower leakage.

Addresses do not depend anymore on the key but only on the randomized key.

First iteration is protected, as the random bit r is generated before the cswap operation.

Writing $Q_0=Q_0$ is not significantly different from writing $Q_0=Q_1$, because everything is overwritten by random words before final writing.

Also, by using registers only for the random bit and the randomized key, and complementary registers, the key is not directly stored, the Hamming weight is balanced by registers duplication with complemented value, and by the rotation of words for bit extraction instead of shifting. Single bit faults are detected by checking the consistency of the register and complemented register.

Of course, without prejudice to the principle of the embodiments, the details of construction and the embodiments may vary widely with respect to what has been described and illustrated herein purely by way of example, without thereby departing from the scope of the present embodiments, as defined the ensuing claims.

Some embodiments may take the form of or comprise computer program products. For example, according to one embodiment there is provided a computer readable medium comprising a computer program adapted to perform one or more of the methods or functions described above. The medium may be a physical storage medium, such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the methods and/or functionality may be implemented or provided in other manners, such as at least partially in firmware and/or hardware, including, but not limited to, one or more application-specific integrated circuits (ASICs), digital signal processors, discrete circuitry, logic gates, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
performing cryptographic operations on data in a processing device, the performing including applying an asymmetric cryptographic procedure including an iterative operation between a first operand formed by a given number of words and a second operand using a secret key,
the iterative operation including, for each bit of the secret key:
applying one of a first set operations and a second set of operations to the first operand and to the second operand depending on the bit of the secret key; and
conditionally swapping words of the first and the second operand on the basis of a control bit value, the control bit value being obtained applying a logic XOR function to a random bit,
wherein the conditional swap includes:
storing in a first register the word of the first operand;
storing in a second register a corresponding word of the second operand;
storing in the word of the first operand the value of the first or second register depending on the control bit value; and
storing in the corresponding word of the second operand the value of the second or first register depending on the control bit value,
wherein the iterative operation includes:
storing the random bit in a first mask register;
generating a randomized key value by performing a logic XOR operation on the current bit of the secret key and the random bit and storing the randomized key value in a second mask register;
storing a bit-wise complement of a value stored in the first mask register in a third mask register; and
storing a bit-wise complement of a value stored in the second mask register in a fourth mask register.

2. A method, comprising:
performing cryptographic operations on data in a processing device, the performing including applying an asymmetric cryptographic procedure including an iterative operation between a first operand formed by a given number of words and a second operand using a secret key,
the iterative operation including, for each bit of the secret key:
applying one of a first set operations and a second set of operations to the first operand and to the second operand depending on the bit of the secret key; and
conditionally swapping words of the first and the second operand on the basis of a control bit value, the control bit value being obtained applying a logic XOR function to a random bit,
wherein the conditional swap includes:
storing in a first register the word of the first operand;
storing in a second register a corresponding word of the second operand;
storing in the word of the first operand the value of the first or second register depending on the control bit value;
storing in the corresponding word of the second operand the value of the second or first register depending on the control bit value; and
after storing in the first register the word of the first operand and storing in the second register a corresponding word of the second operand:
rewriting the first operand and second operand by storing in them respective dummy values;
then storing in the word of the first operand the value of the first or second register depending on the control bit value, overwriting the dummy value of the first operand; and
storing in the corresponding word of the second operand the value of the second or first register depending on the control word value, overwriting the dummy value of the second operand.

3. The method according to claim 2 wherein the respective dummy values are zero or constant values.

4. The method according to claim 2 wherein the respective dummy values are random generated values.

5. The method according to claim 2 wherein the respective dummy values are different from one another.

6. The method according to claim 2, wherein the asymmetric cryptographic procedure is a multiplication operation including, prior to the iterative operation, initializing a mask variable, and the iterative operation includes:
for each bit of the secret key:
setting the random bit;
obtaining a randomized key value by performing a logic XOR operation on the current bit of the secret key and the random bit;
performing the conditional swap using as control bit the result of a logic XOR operation on the mask variable and the random bit;
setting the mask variable to the random bit value; and
performing a loop of the asymmetric cryptographic multiplication selecting the set of operations to apply to the current word of the first operand and to a corresponding word of the second operand depending on the value of the randomized key value.

7. The method according to claim 6, comprising:
storing the random bit in a first mask register;
storing the randomized key value in a second mask register;
storing a bit-wise complement of a value stored in the first mask register in a third mask register; and
storing a bit-wise complement of a value stored in the second mask register in a fourth mask register.

8. The method according to claim 1, wherein the iterative operation includes an Elliptic Curve Cryptography (ECC) scalar multiplication loop or a Rivest-Shamir-Adleman (RSA) modular exponentiation loop.

9. An apparatus, comprising:
a plurality of registers; and
logic circuitry coupled to the plurality of registers, wherein the logic circuitry, in operation, performs, using a secret key, an iterative operation between a first operand formed by a number of words and a second operand, the iterative operation including, for each bit of the secret key:
applying one of a first set operations and a second set of operations to the first operand and to the second operand depending on the bit of the secret key; and conditionally swapping words of the first and the second operand on the basis of a control bit value, the control bit value being obtained applying a logic XOR function to a random bit,
wherein the conditional swap includes:
storing in a first register of the plurality of registers the word of the first operand;
storing in a second register of the plurality of registers a corresponding word of the second operand;
storing in the word of the first operand the value of the first or second register depending on the control bit value; and
storing in the corresponding word of the second operand the value of the second or first register depending on the control bit value,
wherein the iterative operation includes:
storing the random bit in a first mask register;
generating a randomized key value by performing a logic XOR operation on the current bit of the secret key and the random bit and storing the randomized key value in a second mask register;
storing a bit-wise complement of a value stored in the first mask register in a third mask register; and
storing a bit-wise complement of a value stored in the second mask register in a fourth mask register.

10. An apparatus, comprising:
a plurality of registers; and
logic circuitry coupled to the plurality of registers, wherein the logic circuitry, in operation, performs, using a secret key, an iterative operation between a first operand formed by a number of words and a second operand, the iterative operation including, for each bit of the secret key:
applying one of a first set operations and a second set of operations to the first operand and to the second operand depending on the bit of the secret key; and
conditionally swapping words of the first and the second operand on the basis of a control bit value, the control bit value being obtained applying a logic XOR function to a random bit,
wherein the conditional swap includes:
storing in a first register of the plurality of registers the word of the first operand;
storing in a second register of the plurality of registers a corresponding word of the second operand;
storing in the word of the first operand the value of the first or second register depending on the control bit value;
storing in the corresponding word of the second operand the value of the second or first register depending on the control bit value; and
after storing in the first register the word of the first operand and storing in the second register the corresponding word of the second operand:
rewriting the first operand and second operand by storing in them respective dummy values;
storing in the word of the first operand the value of the first or second register depending on the control bit value, overwriting the dummy value of the first operand; and
storing in the corresponding word of the second operand the value of the second or first register depending on the control word value, overwriting the dummy value of the second operand.

11. The apparatus according to claim 10 wherein the respective dummy values are zero or constant values.

12. The apparatus according to claim 10 wherein the respective dummy values are random generated values.

13. The apparatus according to claim 10 wherein the respective dummy values are different from one another.

14. The apparatus according to claim 10 wherein the iterative operation is part of an asymmetric cryptographic procedure including a multiplication operation, and the logic circuitry, in operation, initializes a mask variable prior to the iterative operation, the iterative operation including:
for each bit of the secret key:
setting the random bit;
obtaining a randomized key value by performing a logic XOR operation on the current bit of the secret key and the random bit;
performing the conditional swap using as control bit the result of a logic XOR operation on the mask variable and the random bit; and
setting the mask variable to the random bit value, wherein performing a loop of the asymmetric cryptographic multiplication includes selecting the set of operations to apply to the current word of the first operand and to a corresponding word of the second operand depending on the value of the randomized key value.

15. The apparatus according to claim 14, wherein the logic circuitry, in operation:
stores the random bit in a first mask register of the plurality of registers;
stores the randomized key value in a second mask register of the plurality of registers;
stores a bit-wise complement of a value stored in the first mask register in a third mask register of the plurality of registers; and
stores a bit-wise complement of a value stored in the second mask register in a fourth mask register of the plurality of registers.

16. The apparatus of claim 9, wherein the iterative operation includes an Elliptic Curve Cryptography (ECC) scalar multiplication loop or a Rivest-Shamir-Adleman (RSA) modular exponentiation loop.

17. A system, comprising:
a multiplier;
a random access memory; and
a controller, including:
a plurality of registers; and
logic circuitry coupled to the plurality of registers, wherein the logic circuitry, in operation, performs, using a secret key, an iterative operation between a first operand formed by a number of words and a second operand, the iterative operation including, for each bit of the secret key:
applying one of a first set operations and a second set of operations to the first operand and to the second operand depending on the bit of the secret key; and
conditionally swapping words of the first and the second operand on the basis of a control bit value, the control bit value being obtained applying a logic XOR function to a random bit,
wherein the conditional swap includes:
storing in a first register of the plurality of registers the word of the first operand;
storing in a second register of the plurality of registers a corresponding word of the second operand;
storing in the word of the first operand the value of the first or second register depending on the control bit value; and storing in the corresponding word of the second operand the value of the second or first register depending on the control bit value,
wherein the iterative operation includes:
  storing the random bit in a first mask register;
  generating a randomized key value by performing a logic XOR operation on the current bit of the secret key and the random bit and storing the randomized key value in a second mask register;
  storing a bit-wise complement of a value stored in the first mask register in a third mask register; and
  storing a bit-wise complement of a value stored in the second mask register in a fourth mask register.

18. A system, comprising:
a multiplier;
a random access memory; and
a controller, including:
  a plurality of registers; and
  logic circuitry coupled to the plurality of registers, wherein the logic circuitry, in operation, performs, using a secret key, an iterative operation between a first operand formed by a number of words and a second operand, the iterative operation including, for each bit of the secret key:
    applying one of a first set operations and a second set of operations to the first operand and to the second operand depending on the bit of the secret key; and
    conditionally swapping words of the first and the second operand on the basis of a control bit value, the control bit value being obtained applying a logic XOR function to a random bit,
  wherein the conditional swap includes:
    storing in a first register of the plurality of registers the word of the first operand;
    storing in a second register of the plurality of registers a corresponding word of the second operand;
    storing in the word of the first operand the value of the first or second register depending on the control bit value;
    storing in the corresponding word of the second operand the value of the second or first register depending on the control bit value; and
    after storing in the first register the word of the first operand and storing in the second register the corresponding word of the second operand:
      rewriting the first operand and second operand by storing in them respective dummy values;
      storing in the word of the first operand the value of the first or second register depending on the control bit value, overwriting the dummy value of the first operand; and
      storing in the corresponding word of the second operand the value of the second or first register depending on the control word value, overwriting the dummy value of the second operand.

19. The system according to claim 18 wherein the iterative operation is part of an asymmetric cryptographic procedure including a multiplication operation, which, in operation is performed by the multiplier, and the logic circuitry, in operation, initializes a mask variable prior to the iterative operation, the iterative operation including:
for each bit of the secret key:
  setting the random bit;
  obtaining a randomized key value by performing a logic XOR operation on the current bit of the secret key and the random bit;
  performing the conditional swap using as control bit the result of a logic XOR operation on the mask variable and the random bit; and
  setting the mask variable to the random bit value,
wherein performing a loop of the asymmetric cryptographic multiplication includes selecting the set of operations to apply to the current word of the first operand and to a corresponding word of the second operand depending on the value of the randomized key value.

20. The system according to claim 19 wherein the logic circuitry, in operation:
  stores the random bit in a first mask register of the plurality of registers;
  stores the randomized key value in a second mask register of the plurality of registers;
  stores a bit-wise complement of a value stored in the first mask register in a third mask register of the plurality of registers; and
  stores a bit-wise complement of a value stored in the second mask register in a fourth mask register of the plurality of registers.

21. A non-transitory computer-readable medium having contents which cause a computing device to perform an asymmetric cryptographic procedure including an iterative operation, the iterative operation on a first operand formed by a given number of words and a second operand using a secret key, the iterative operation including, for each bit of the secret key:
  applying one of a first set operations and a second set of operations to the first operand and to the second operand depending on the bit of the secret key; and
  conditionally swapping words of the first and the second operand on the basis of a control bit value, the control bit value being obtained applying a logic XOR function to a random bit,
wherein the conditional swap includes:
  storing in a first register the word of the first operand;
  storing in a second register a corresponding word of the second operand;
  storing in the word of the first operand the value of the first or second register depending on the control bit value; and
  storing in the corresponding word of the second operand the value of the second or first register depending on the control bit value,
wherein the iterative operation includes:
  storing the random bit in a first mask register;
  generating a randomized key value by performing a logic XOR operation on the current bit of the secret key and the random bit and storing the randomized key value in a second mask register;
  storing a bit-wise complement of a value stored in the first mask register in a third mask register; and
  storing a bit-wise complement of a value stored in the second mask register in a fourth mask register.

22. The non-transitory computer-readable medium according to claim 21 wherein the contents comprise instructions executed by the computing device.

23. A non-transitory computer-readable medium having contents which cause a computing device to perform an asymmetric cryptographic procedure including an iterative operation, the iterative operation on a first operand formed by a given number of words and a second operand using a secret key, the iterative operation including, for each bit of the secret key:

applying one of a first set operations and a second set of operations to the first operand and to the second operand depending on the bit of the secret key; and conditionally swapping words of the first and the second operand on the basis of a control bit value, the control bit value being obtained applying a logic XOR function to a random bit, wherein the conditional swap includes:
  storing in a first register the word of the first operand;
  storing in a second register a corresponding word of the second operand;
  storing in the word of the first operand the value of the first or second register depending on the control bit value;
  storing in the corresponding word of the second operand the value of the second or first register depending on the control bit value; and
  after storing in the first register the word of the first operand and storing in the second register the corresponding word of the second operand:
    rewriting the first operand and second operand by storing in them respective dummy values;
    storing in the word of the first operand the value of the first or second register depending on the control bit value, overwriting the dummy value of the first operand; and
    storing in the corresponding word of the second operand the value of the second or first register depending on the control word value, overwriting the dummy value of the second operand.

* * * * *